United States Patent Office 3,291,863
Patented Dec. 13, 1966

3,291,863
THERMOPLASTIC MIXTURES OF VINYL CHLORIDE POLYMERS WITH CHLORINATED POLYOLEFINS OF HIGH MOLECULAR WEIGHT AND PROCESS FOR PREPARING SAME
Hans-Helmut Frey, Frankfurt am Main, Helmut Klug and Karl-Heinz Mittelberger, Gersthofen near Augsburg, and Friedrich Nolte, Muhlheim (Ruhr), Germany, assignors to Farbwerke Hoechst Aktiengesellschaft vormals Meister Lucius & Brüning, Frankfurt am Main, Germany, a corporation of Germany
No Drawing. Filed Jan. 28, 1964, Ser. No. 340,825
Claims priority, application Germany, Apr. 18, 1959, F 28,249
15 Claims. (Cl. 260—897)

The present application is a continuation-in-part application of application Serial No. 23,877 filed April 18, 1960, now abandoned.

It has already been proposed to render polyvinyl chloride and vinyl chloride copolymers elastic by admixing them with chlorination products of olefin polymers obtained by chlorinating olefin polymers in aqueous suspension at a temperature above 90–100° C. and below 150° C., and containing about 25.50% by weight of chlorine. In contradistinction to the aforesaid chlorination products of olefin polymers which have been produced in the said temperature range, chlorination products of olefin polymers that have been prepared at lower temperatures than those mentioned above do not possess an elasticising action. On the contrary, the addition of the latter products to polyvinyl chloride or vinyl chloride copolymers may bring about an embrittlement of the mixtures, in circumstances to an extent such that the shaped articles made of said mixtures break under even a slight bending stress, in other words said mixtures are extremely brittle.

It has now been found that polymers of vinyl chloride, which include homopolymers of vinyl chloride and copolymers of vinyl chloride, can also be rendered elastic with chlorinated olefin polymers of high molecular weight, which have been substantially chlorinated at low temperatures, then chlorinated in the final phase of the chlorination at a temperature above 110° C.

By copolymers of vinyl chloride which can be rendered elastic according to the invention there are to be understood products which are preponderantly composed of vinyl chloride, that is to say contain more than 50% by weight of vinyl chloride. As copolymerization components there can be used vinyl esters such as vinyl acetate, vinyl propionate or vinyl butyrate, vinyl stearate, vinylidene chloride, esters of aliphatic, saturated alcohols containin 1–10 carbon atoms with acrylic acid, methacrylic acid, maleic acid or fumaric acid.

The chlorination products of olefin polymers to be used according to the invention are prepared in a manner such that the chlorination is first carried out at a temperature in the range from 60 to 90° C. In the last stage of the chlorination process the temperature must be above 110° C. and below 150° C. It is not absolutely necessary to realize the chlorination in two stages only; from an industrial point of view it is often desirable to chlorinate in several stages. It is possible, for example, to chlorinate an olefin polymer suspended in an aqueous medium first at a low temperature and then to terminate the chlorination while gradually heating the suspension to a temperature above 110° C. It is only important to carry out the final phase of the chlorination, in which at least 5% of chlorine are introduced into the chlorination product, at a temperature above 110° C. The preparation of the chlorination products to be used according to the invention has been described, for example, in U.S. patent application Serial No. 761,454, filed September 17, 1958.

Also the molecular weight of the starting olefin polymers influences to a great extent the degree of elasticization of polyvinyl chloride or vinyl chloride copolymers rendered elastic by means of chlorinated olefin polymers. The higher the molecular weight of the starting olefin polymers, the more tough and elastic the masses that can be produced by the process of the invention. It has been found that chlorination products of such olefin polymers, particularly polyethylenes, as have a $\eta$ red value of more than 0.5 and advantageously more than 0.8 are especially suitable as mixing components. The reduced viscosity is determined in a 0.5% solution of olefin polymers in tetrahydronaphthalene at 120° C. The reduced viscosity can be used as a relative measurement for the molecular weight. Olefin polymers having a reduced viscosity $\eta$ red of more than 0.5 and preferably more than 0.8 can be chlorinated with special advantage in aqueous suspension on account of their limited solubility in organic solvents. Chlorination products of such olefin polymers as have a reduced viscosity $\eta$ red below 0.5 and correspondingly a low molecular weight possess a smaller elasticizing action for vinyl chloride containing polymers. In general it is not recommended to use chlorination products of such olefin polymers as have a higher molecular weight than corresponds to $\eta$ red of 20 and there above since the working up of mixtures produced with chlorination products of this kind involves under practical conditions a number of difficulties. Olefin polymers having a reduced viscosity $\eta$ red in the range from about 1 to about 10 have proved to be especially suitable as starting material for the chlorination products to be used according to the invention.

By chlorinated olefin polymers of high molecular weight there are to be understood chlorination products of homopolymers and copolymers of monoolefins, for example ethylene and propylene. Especially suitable are chlorination products of polyethylene and of copolymers of ethylene with propylene. There is nothing critical in the process by which one prepares the starting olefin polymers that are to be used in the form of their chlorination products for elasticizing vinyl chloride polymers. It is only necessary that the starting polymers possess a sufficiently high molecular weight. There can be used, for example, chlorination products of a polyethylene prepared by a high pressure polymerization process, that is to say under a pressure above 1000 atmospheres and at a temperature above 200° C. Especially suitable effects are obtained, however, with chlorination products of polyethylenes produced by a low pressure polymerization process, that is to say under a pressure of up to 100 atmospheres and at a temperature of up to 100° C. Above all there is mentioned the Ziegler polyethylene, i.e. polyethylenes having a density of 0.93–0.95 which have been produced with a catalyst system composed of organo-metal compounds and reducible heavy metal compounds. Excellent results are obtained when using the chlorination product of the portion of ethylene/propylene copolymers that is insoluble in a hydrocarbon having a boiling range of 30 to 200° C.

Apart from the $\eta$ red values of the starting olefin polymers the $\eta$ red values of the chlorination products are likewise very important, especially for the workability of the mixtures prepared from such chlorination products and polymers of vinyl chloride. The addition of chlorinated olefin polymers having low $\eta$ red values to polymers of vinyl chloride yields masses having an improved workability. In the working up of plastic masses of this kind it is essential to obtain as smooth a sheet as possible on rolling, as results for example from the following statements:

(A) A Ziegler low pressure polyethylene having a reduced viscosity η red of 2.0 (determined in a 0.5% solution in tetrahydronaphthalene at 120° C.) is chlorinated in stages as described above until a chlorination product containing 40% of chlorine and having a reduced viscosity η red of 1.2 (determined in a 0.5% solution in tetrahydronaphthalene at 120° C.) is obtained. A mixture of 35% by weight of said chlorination product with 65% by weight of a suspension vinyl chloride having a K value (according to Fikentscher Cellulose-chemie 13, 58 (1932)) of 70 yields on rolling with the addition of 1% by weight of barium-cadmium laurate and 1% by weight of an epoxide resin at 175° C. and after 10 minutes a smooth rolling sheet.

(B) When a low pressure polyethylene having a reduced viscosity η red of 4 is chlorinated under the same conditions until a chlorine content of 40% is reached a chlorination product is obtained having a reduced viscosity η red of 2.1. A mixture of 35% by weight of said chlorination product with 65% by weight of a suspension polyvinyl chloride having a K value of 70 yields under the conditions mentioned sub (A) only a rough, crepe-like rolling sheet. Consequently, the chlorination product having a higher reduced viscosity η red is more difficult to work up.

The dependence of the η red values (determined in 0.5% solutions in tetrahydronaphthalene at 120° C.) of the chlorination products on the nature of the starting olefin polymers (also defined by their η red values) and on the chlorination conditions, either in one stage or in several stages, results from the following table. Low pressure polyethylenes are either chlorinated in a first stage in water at 70° C. until the values indicated in the table are reached and the chlorination is continued in a second stage at 120° C. or the same low pressure polyethylenes are chlorinated only at 120° C. until the same chlorine content is obtained, without a stage at 70° C. being carried out.

TABLE

| η Red of polyethylene | Final Cl content, 1st stage, 70° C. | Final Cl content, 2d stage, 120° C. | Final Cl content, 120° C. throughout the chlorination | η Red of final polyethylene |
|---|---|---|---|---|
| 4.4 | 43.5 | 45.9 | | 1.4 |
| 4.4 | | | 46.7 | 1.8 |
| 4.4 | 29.3 | 44.2 | | 1.4 |
| 4.4 | 39.2 | 45.0 | | 1.4 |
| 1.6 | 36.4 | 44.2 | | 0.8 |
| 1.6 | | | 43.3 | 1.0 |
| 1.6 | | | 46.7 | 0.9 |
| 1.5 | 25.0 | 40.8 | | 0.8 |
| 1.5 | | | 39.5 | 0.9 |
| 1.5 | 28.9 | 40.2 | | 0.8 |
| 1.3 | 29.7 | 41.8 | | 0.7 |
| 1.3 | | | 39.5 | 0.8 |
| 1.2 | 22.8 | 52.5 | | 0.8 |
| 2.0 | 28.1 | 62.5 | | 0.8 |

The chlorine content of the chlorination products of olefin polymers to be used according to the invention may vary within wide limits. When chlorination products containing only about 20% of chlorine are mixed with vinyl chloride containing polymers there are already obtained masses having improved properties. The improvement of the mixtures which can be obtained by the addition of olefin polymer chlorination products containing more than 50% chlorine to polymers of vinyl chloride are only small. Products having a chlorine content within the order of magnitude of that of polyvinyl chloride do not show any special effects. Especially suitable are chlorination products containing 30-45% of chlorine. The optimum chlorine content somewhat depends on the chlorination process, without the latter fundamentally modifying the effectiveness of the products to be added according to the invention.

The amount of chlorination product added can vary within wide limits. An improvement can already be obtained when the polymers of vinyl chloride are admixed with 5% by weight or a little more of the olefin polymer chlorination products. Especially suitable are mixtures of 10–50% by weight of chlorination products with 90–50% by weight of polymers of vinyl chloride.

It is of advantage to use mixtures of the chlorination products of olefin polymers as mixing component; the chlorine content can vary within the limits indicated above.

The components can be mixed according to known processes. Prior to working up the mixtures of the invention it is of advantage to add stabilizers. Particularly suitable are the stabilizers which are known for the polyvinyl chloride processing.

It is furthermore possible to add to the mixtures of the invention plasticizers, fillers, pigments and dyestuffs, known from the polyvinyl chloride processing, in order to obtain special effects.

Depending on the proportion of chlorinated olefin polymers, the mixtures of the invention are suitable for the manufacture of tubes, profiles, sheets, films, cables, bottles, flexible pipes or injection molded articles since it is possible to prepare mixtures having any degree of softness or elasticity within the range of pure vinyl chloride containing polymer, on the one hand, and a chlorinated olefin polymer, on the other.

The following examples serve to illustrate the invention but they are not intended to limit it thereto, the parts being by weight unless otherwise stated.

*Example 1*

In a closed enameled reaction vessel 100 parts of Ziegler low pressure polyethylene having a reduced viscosity of 4.4 (determined in a 0.5% solution in tetrahydronaphthalene at 120° C.) were first chlorinated in water at 70° C. until a chlorine content of 37% was reached. About 120 parts of chlorine were consumed. Then the aqueous dispersion of chlorinated polyethylene was heated to 120° C. and the chlorination was continued in said second stage until a chlorine content of 46% was reached. Further 55 parts of chlorine were required. The chlorination product was separated from the aqueous, hydrogen chloride containing layer by centrifuging and washed with desalted water. The yield amounted to 178 parts (chlorination product A).

The chlorination product had a reduced viscosity of 1.3–1.4 (as a 0.5% solution in tetrahydronaphthalene at 120° C.) whereas the same polyethylene chlorinated in water at 120° C. only until the same chlorine content was reached had a reduced viscosity of 1.8 (chlorination product B).

On rolling polyvinyl chloride with the chlorination product A and the chlorination product B, respectively, it was found that with the product A, that is to say the product having the lower reduced viscosity, a sheet could be obtained having improved properties as compared with the sheet obtained with product B. As pointed out above it is important to obtain on rolling as smooth a sheet as possible.

Mixtures of the chlorination product A with a suspension of polyvinyl chloride having a K value of 70 (determined in a 1% solution in cyclohexane at 20° C.) showed over a wide mixing range a good compatibility, a high elongation at break and simultaneously a good tensile strength. Mixtures having the compositions indicated in the following table were rolled for 15 minutes at 175° C. and samples of the sheets obtained were then pressed at 170° C. The following values were obtained. For the sake of comparison the table also gives the values of the pure chlorination product A.

TABLE

| Product | Notched bar impact strength cm. kg./cm.² | Tensile strength kg./cm.² | 100% modulus kg./cm.² | Elongation at break (Percent) |
|---|---|---|---|---|
| A without PVC | | 135 | 90 | 228 |
| 50 percent A+50 percent PVC | Without break | 320 | 230 | 250 |
| 35 percent A+65 percent PVC | do | 330 | 280 | 180 |
| 20 percent A+80 percent PVC | do | 410 | 370 | 110 |

PVC = polyvinyl chloride.

The good compatibility of the chlorinated polyethylene prepared by the chlorination process in stages with polyvinyl chloride also results in good transparency of the polymer mixtures, even with a mixing ratio of 1:1.

*Example 2*

As described in Example 1, on the one hand a low pressure polyethylene ($\eta$ red=2) was chlorinated in water at 70° C. until a chlorine content of 30% was reached and the chlorination was continued at 118° C. to a chlorine content of 39% (product C) and, on the other hand, the same low pressure polyethylene was chlorinated in water at 118° C. to a chlorine content of 39% (product D). Product C had a reduced viscosity $\eta$ red of 1.0 and product D had a reduced viscosity $\eta$ red of 1.1. The following table illustrates the advantages of product C prepared in accordance with the invention.

TABLE

| Mixing ratio PVC: chlorinated polyethylene | Notched bar impact strength cm. kg./cm.² 0° C. | Tensile strength kg./cm.² | 100% modulus kg./cm.² | Elongation at break percent |
|---|---|---|---|---|
| Mixtures with product C | | | | |
| 65/35 | 27 | 245 | 237 | 121 |
| 80/20 | | 303 | | 76 |
| Mixtures with product D | | | | |
| 65/35 | 24 | 196 | 200 | 99 |
| 80/20 | | 304 | | 58 |

We claim:

1. A process for imparting elasticity to polymers of vinyl chloride which comprises adding to 90–50% by weight of said polymer of vinyl chloride 10–50% by weight of a chlorinated polymer of monoolefins selected from the group consisting of ethylene, propylene, and mixtures thereof, containing 20–50% by weight of chlorine, obtained by chlorinating the polymer in the presence of water at a temperature at first within the range of 60° C. and 90° C. and then at a temperature above 110° C. as the lower limit and up to 150° C. as the upper limit, whereby in the final phase of the chlorination at least 5% by weight of chlorine is introduced into the chlorination product.

2. The process of claim 1 wherein said chlorinated monoolefinic polymer is a chlorinated polyethylene.

3. The process of claim 1 wherein said chlorinated monoolefinic polymer is the chlorination product of a monoolefinic polymer having a reduced viscosity within the range of 0.5–20 determined in a solution of 0.5% strength of the polymer in tetrahydronaphthalene at 120° C.

4. The process of claim 1 wherein said chlorinated monoolefinic polymer has a chlorine content within the range of 30–45% by weight.

5. A process for imparting elasticity to polymers of vinyl chloride which comprises adding to 90–50% by weight of said polymer of vinyl chloride 10–50% by weight of a chlorinated low pressure polyolefin obtained by chlorinating a low pressure polyolefin in the presence of water at a temperature at first within the range of about 60° C. to 90° C. and then at a temperature of above 110° C. as the lower limit and up to 150° C. as the upper limit, said low pressure polyolefin containing 20–50% by weight of chlorine and being prepared by the polymerization of a lower monoolefin in the presence of a catalyst composed of an organo-metal compound and a reducible salt of a heavy metal selected from subgroups IV–VI of the Periodic Table.

6. The process of claim 5 wherein said polyolefin is a chlorinated low pressure polyethylene.

7. The process of claim 5 wherein said chlorinated low pressure polyolefin is the chlorination product of a polyethylene having a density within the range of 0.93–0.95.

8. A process for imparting elasticity to polymers of vinyl chloride which comprises adding to 90–50% by weight of said polymer of vinyl chloride 10–50% by weight of a chlorinated low pressure copolymer of ethylene and propylene containing 20–50% by weight of chlorine obtained by chlorinating said copolymer at a temperature first within the range of about 60° C. to 90° C. and then at a temperature above 110° C. as the lower limit and up to 150° C. as the upper limit, said low pressure copolymer being prepared by the copolymerization of ethylene and propylene in the presence of a catalyst composed of a metallo-organic compound and a reducible salt of a heavy metal selected from subgroups IV–VI of the Periodic Table.

9. The process of claim 8 wherein said ethylene/propylene copolymer is insoluble in aliphatic hydrocarbons boiling between 30° C. and 200° C.

10. A process for imparting elasticity to polymers of vinyl chloride which comprises adding to 90–10% by weight of said polymer of vinyl chloride 10–50% by weight of a chlorinated low pressure polymer of a monoolefin selected from the group consisting of ethylene, propylene, and mixtures thereof, containing 20–50% by weight of chlorine, obtained by chlorinating the polymer in the presence of water at a temperature at first within the range of 60° C. and 90° C. and then at a temperature above 110° C. as the lower limit and up to 150° C. as the upper limit, whereby in the final phase of the chlorination at least 5% by weight of chlorine is introduced into the chlorination product, said low pressure monoolefinic polymer being prepared by the polymerization of said monoolefin in the presence of a catalyst composed of an organo-metal compound and a reducible salt of a heavy metal selected from subgroups IV–VI of the Periodic Table.

11. An elastomeric composition comprising 90–50% by weight of a polymer of vinyl chloride having added thereto 10–50% by weight of a chlorinated polymer of monoolefins selected from the group consisting of ethylene, propylene, and mixtures thereof, said chlorinated monoolefinic polymer containing 20–50% by weight of chlorine and being obtained by chlorinating said monoolefinic polymer in the presence of water at a temperature at first within the range of about 60° C. to 90° C. and then at a temperature above 110° C. as the lower limit and up to 150° C. as the upper limit.

12. The composition of claim 11 wherein said chlorinated monoolefinic polymer contains 30–45% by weight of chlorine.

13. An elastomeric composition comprising 90–50% by weight of a polymer of vinyl chloride having admixed therewith 10–50% by weight of a chlorinated low pressure polymer of monoolefins selected from the group consisting of ethylene, propylene and mixtures thereof, said chlorinated low pressure polymer containing 20–50% by weight of chlorine and being obtained by chlorinating said polymer in the presence of water at a temperature at first within the range of about 60° C. to 90° C. and then at a temperature above 110° C. as the lower limit and up to 150° C. as the upper limit, said low pressure polymer being prepared by the polymerization of a monomer selected from the group consisting of ethylene, propylene and mixtures thereof in the presence of a catalyst composed of an organo-metal compound and a reducible salt of a heavy metal selected from subgroups IV–VI of the Periodic Table.

14. The composition of claim 13 wherein said chlorinated low pressure polymer is a chlorinated low pressure polyethylene.

15. The composition of claim 13 wherein said chlorinated low pressure polymer is a chlorination product of the fraction of a low pressure copolymer of ethylene and propylene which is insoluble in aliphatic hydrocarbons boiling between 30° C. and 200° C.

References Cited by the Examiner

UNITED STATES PATENTS

| | | | |
|---|---|---|---|
| 2,398,803 | 4/1946 | Myles et al. | 260—94.9 |
| 2,592,763 | 4/1952 | Taylor | 260—94.9 |
| 3,165,560 | 1/1965 | Frey et al. | 260—897 |

MURRAY TILLMAN, *Primary Examiner.*

E. B. WOODRUFF, *Assistant Examiner.*